US006390429B1

United States Patent
Brincat

(10) Patent No.: US 6,390,429 B1
(45) Date of Patent: May 21, 2002

(54) DEVICE FOR SECURING AN AUTOMATIC TOLL-TAKING TRANSCEIVER ONTO A MOTORCYCLE

(76) Inventor: Patrick Brincat, 21 Cornell Ave., Staten Island, NY (US) 10310

( * ) Notice: Subject to any disclaimer, the term of this patent is extended or adjusted under 35 U.S.C. 154(b) by 0 days.

(21) Appl. No.: 09/628,317

(22) Filed: Jul. 28, 2000

(51) Int. Cl.[7] .................................................. B62J 7/00
(52) U.S. Cl. ........................... 248/309.1; 248/316.8; 224/420; 224/428; 224/447
(58) Field of Search ................... 224/413, 420, 224/428, 441, 447, 450, 460; 248/309.1, 310, 312, 312.1, 313, 316.8, 220.21, 223.31

(56) References Cited

U.S. PATENT DOCUMENTS

| | | | | |
|---|---|---|---|---|
| 789,519 A | * | 5/1905 | Zeisinger | 174/155 |
| 1,222,458 A | * | 4/1917 | Peterson | 362/474 |
| 1,742,069 A | * | 12/1929 | Greenwald et al. | 248/229.15 |
| 2,634,527 A | | 4/1953 | Pletscher | 40/13 |
| 3,193,234 A | * | 7/1965 | Thurman et al. | 248/313 |
| 3,285,559 A | * | 11/1966 | Simon | 248/313 |
| 3,380,698 A | * | 4/1968 | Goldberg et al. | 248/229.26 |
| 3,598,295 A | | 8/1971 | Seegers | 224/41 |
| 4,244,496 A | * | 1/1981 | Litz | 224/413 |
| 4,436,350 A | | 3/1984 | Jolin | 312/7.1 |
| 4,697,725 A | | 10/1987 | Miree | 224/41 |
| 4,756,454 A | * | 7/1988 | Villanueva et al. | 224/418 |
| 5,005,661 A | * | 4/1991 | Taylor et al. | 180/219 |
| 5,040,710 A | * | 8/1991 | Lee | 224/416 |
| 5,114,060 A | | 5/1992 | Boyer | 224/32 |
| 5,487,497 A | * | 1/1996 | Kwiatkowski | 224/420 |
| 5,651,485 A | * | 7/1997 | Impastato, II | 224/460 |
| 5,681,019 A | * | 10/1997 | Boyce | 248/229.11 |
| 5,738,320 A | * | 4/1998 | Matos et al. | 248/242 |
| 6,109,658 A | * | 8/2000 | Moore | 281/42 |

* cited by examiner

Primary Examiner—Leslie A. Braun
Assistant Examiner—Jon Szumny
(74) Attorney, Agent, or Firm—Goldstein Law Offices, P.C.

(57) ABSTRACT

A system for displaying an automatic toll-taking transceiver upon a motorcycle having a handlebar and a mirror assembly mounted thereupon, using a display bracket having a holder and an extension arm. The holder includes a main member which forms a u-shaped opening and has a securing strap extending transverse to the main member. The extension arm has a lower tab which secures between the handlebar and mirror assembly. The transceiver is held within the u-shaped opening, and is secured in place with the securing strap.

1 Claim, 3 Drawing Sheets

DEVICE FOR SECURING AN AUTOMATIC TOLL-TAKING TRANSCEIVER ONTO A MOTORCYCLE

BACKGROUND OF THE INVENTION

The invention relates to a device for securing an automatic toll-taking transceiver onto a motorcycle. More particularly, the invention relates to a bracket which attaches onto a standard motorcycle handlebar and allows an automatic toll-taking transceiver to be removably mounted thereupon so that it may be detected at an automatic toll-taking facility.

Numerous highways, bridges, and tunnels across the country collect tolls from the motorists who use them—in order to help defray the cost of building and maintaining these facilities, as well as to support other public programs. Traditionally, these toll are collected in cash from each individual motorist at a toll booth.

The traditional toll booth collection system has been found to be undesirable. The toll taking process interrupts the flow of traffic, causing traffic and delays. Most motorists are annoyed about the prospect of having to wait in order to pay a toll. In addition, idling motor vehicles waiting their turn to pay a toll waste immeasurable amounts of fuel and cause increased pollution. Further, numerous traffic accidents and fatalities occur every year at toll plazas.

Accordingly, as the technology became feasible, automatic toll-taking systems were implemented throughout the country along toll highways and at toll bridges and tunnels, in an attempt to eliminate the need for motorists to stop at toll booths to pay their tolls. These automatic toll-taking systems employ individual transceivers which are each assigned to an individual motorist. The transceivers are linked to an account held by the motorist. As the motorist travels through a toll-taking facility, the transceiver is interrogated to determine its identity. Once identified by the toll-taking facility, the motorist's account is charged by the amount of the toll. Thus, the need for the motorist to stop, or even carry cash is eliminated.

Such transceivers are highly convenient for typical automobiles. The automobile motorist either leaves the transceiver adhered to the windshield, or uses his or her free hand to wave the transceiver toward the windshield while traveling through the toll-taking facility.

However, motorcyclists have not enjoyed similar ease when using automatic toll-taking systems. Motorcycle operation is a two-handed proposition. While motorcyclists have always had trouble at toll booths, the use of a transceiver does not make the toll-taking process easier or safer for the motorcyclist. Arguably the need to wave the transceiver without stopping the motorcycle makes it more difficult and more dangerous for the motorcyclist.

Other devices have been proposed which may be used to mount a variety of items onto or near the handlebars of a vehicle, such as a bicycle or a motorcycle.

For example, U.S. Pat. No. 503,058 to McGriff discloses a device which allows an item such as a clock to be attached onto the handlebars of the bicycle. McGriff employs a clamp which attaches over and around the t-shaped connection present on some bicycle handle bars. Unfortunately, not all bicycles, and few modern motorcycles have such a configuration. Accordingly, McGriff is not suitable for universal use.

Similarly, U.S. Pat. No. 2,634,527 to Pletscher; U.S. Pat. No. 3,598,295 to Seegers; U.S. Pat. No. 4,436,350 to Jolin; U.S. Pat. No. 4,697,725 to Miree; and U.S. Pat. No. 5,114,060 to Boyer all disclose devices which employ clamping means which attach onto the cylindrical portions of the handle bar, and tighten thereon. such arrangements will generally be suitable for use with certain motorcycles, but will be unusable on many other motorcycles which simply have different handle bar sizes and configurations.

Accordingly, while these units may be suitable for the particular purpose employed, or for general use, they would not be as suitable for the purposes of the present invention as disclosed hereafter.

SUMMARY OF THE INVENTION

It is an object of the invention to provide a system for effectively displaying an automatic toll-taking transceiver in conjunction with a motorcycle, so that the transceiver can be effectively read by a toll-taking system. Accordingly, the system provides a display bracket which attaches onto the motorcycle handle bar and holds the transceiver in a position relative to the motorcycle where it can be easily read by the toll-taking system.

It is another object of the invention to provide a system which ensures the safety of the motorcyclist while using the automatic toll taking system. Accordingly, the display bracket is configured so that it and the transceiver supported thereby can remain in place on the handle bar while the motorcycle is in operation.

It is another object of the invention that the transceiver is protected from theft when the motorcycle is not in operation. Accordingly, the display bracket is configured so that the transceiver is removably mounted thereto. Thus, the transceiver may be easily removed from the display bracket when the motorcycle is not in operation.

It is a further object of the invention that the display bracket easily attaches onto all standard motorcycles. Accordingly, the display bracket utilizes one of the rear view mirror mountings on the handle bars to effect secure permanent mounting of the display bracket.

The invention is a system for displaying an automatic toll-taking transceiver upon a motorcycle having a handlebar and a mirror assembly mounted thereupon, using a display bracket having a holder and an extension arm. The holder includes a main member which forms a u-shaped opening and has a securing strap extending transverse to the main member. The extension arm has a lower tab which secures between the handlebar and mirror assembly. The transceiver is held within the u-shaped opening, and is secured in place with the securing strap.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
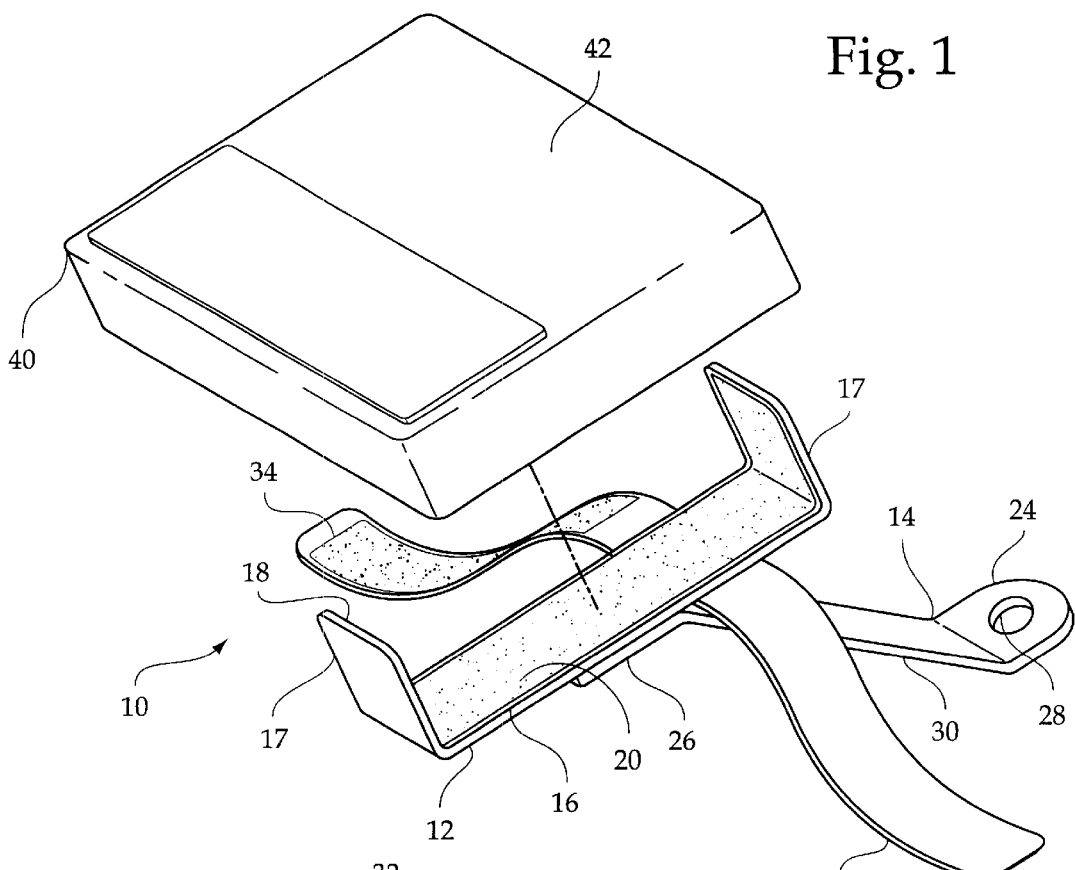
FIG. 1 is a diagrammatic perspective view, illustrating the invention per se, wherein the automatic toll-taking transceiver is about to be mounted upon the display bracket.

FIG. 1 illustrates a display bracket 10, comprising a holder 12 and an extension arm 14. The holder 12 generally comprises a main member 16 made of a single piece of metal, having two right angle bends which form end walls 17 so as to form a u-shaped opening 18. The u-shaped opening 18 is covering with non-slip gripping material 20, which may be made of rubber.

The extension arm 14 comprises a pair of horizontal tabs, namely a lower tab 24 and an upper tab 26. The lower tab 24 has a lower tab bore 28 extending therethrough. The upper tab 26 is rigidly attached to the main member 16 of the holder 12. The extension arm 14 also comprises a transition piece 30 extending between the lower tab 24 and upper tab 26, such that the lower tab 24 and upper tab 26 are substantially parallel to each other, and each form a congruent obtuse angle with the transition piece 30.

A securing strap 32 is attached to the holder 12, wherein the securing strap extends transverse to the main member 16 and is rigidly attached thereto. The securing strap 32 has fastener material 34 thereon which allows the strap 32 to be formed into a loop and to attach onto itself to close said loop.

Figure 2:
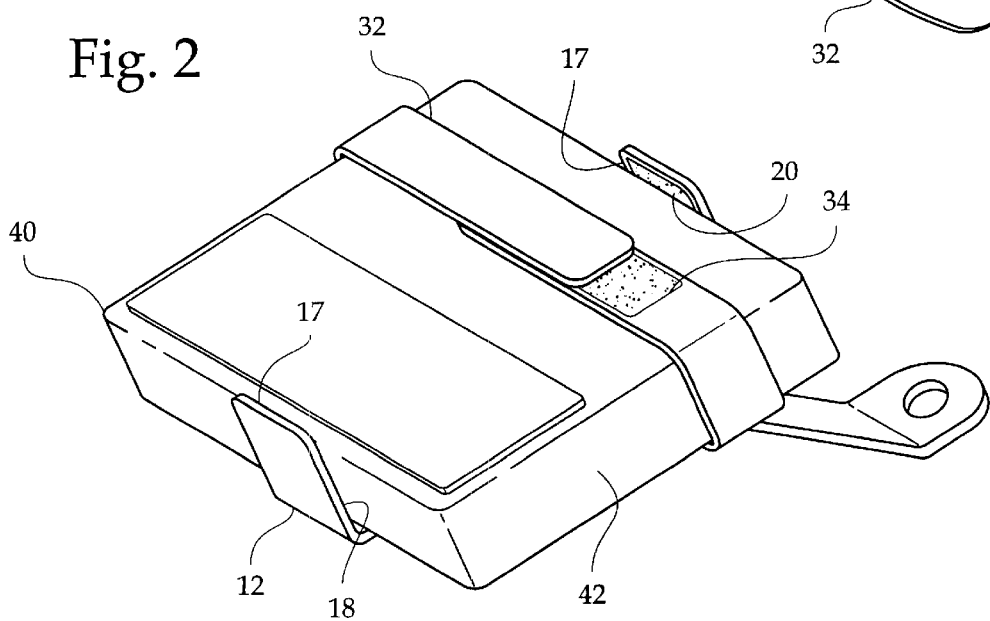
FIG. 2 is a diagrammatic perspective view, wherein the transceiver is being securely held onto the display bracket with a securing strap according to the present invention.

As seen in FIG. 1, the bracket 10 is used in conjunction with a transceiver 40 which uniquely identifies the motorist. The transceiver 40 has a housing 42 which is generally in the shape of a rectangular prism. Referring then to FIG. 1 and FIG. 2, in order to secure the transceiver 40 into the bracket 10, the housing 42 is placed within the holder 12, wherein the housing 42 is located fully within the u-shaped opening 18 and between the end walls 17. The non-slip gripping material 20 contacts the housing, and prevents the housing 42 from slipping within the u-shaped opening 18. In addition, the securing strap 32 is wrapped fully around the housing 42, forming a closed loop which encases the transceiver, wherein the fastener material 34 maintains the closed loop of the strap 32 and thereby maintains the transceiver 40 within the holder 12.

Figure 3:
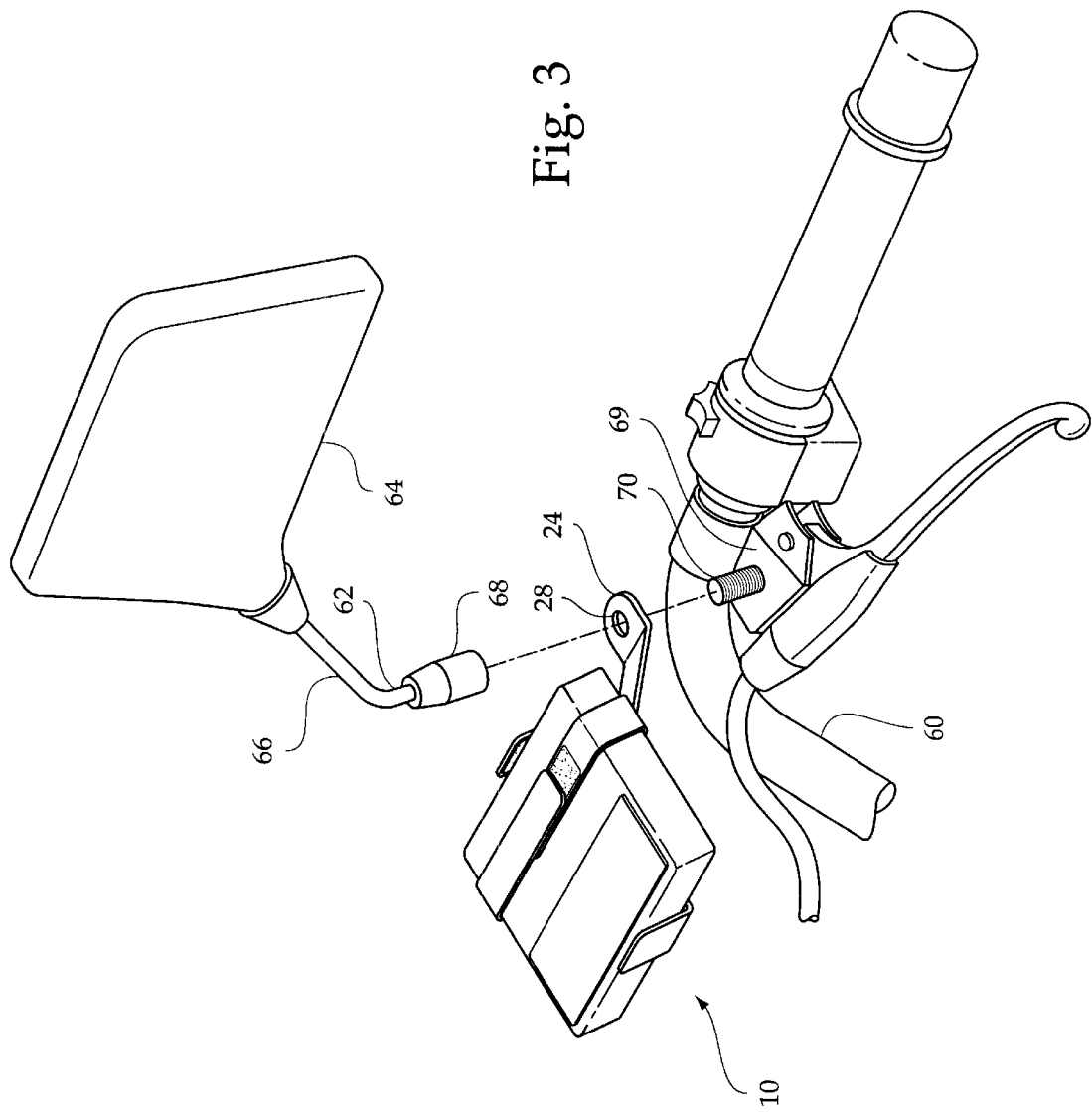
FIG. 3 is an exploded view, illustrated the intended manner of mounting of the display bracket, wherein the rearview mirror of a motorcycle has been removed from the handle bar and is being reinstalled while securing the display bracket in place.

FIG. 3 illustrates the preferred manner of mounting for the bracket 10 to a motorcycle handle bar 60. The handle bar includes a rear view mirror assembly 62, which has a mirror 64, a mirror arm 66, and a collar 68. A threaded nipple 70 extends upward from a mounting surface 69 on the handle bar 60. Generally, the rear view mirror assembly 62 mounts to the handle by securing the collar 68 onto the threaded nipple 70 and tightening against the mounting surface 69. The mirror arm 66 rigidly attaches the mirror 64 to the collar 68.

To mount the display bracket 10 then, the rear view mirror assembly 62 is removed from the handle bar 60 by loosening the collar 68 from the threaded nipple 70 and removing the collar 68 therefrom. Then, the lower tab 24 of the extension arm is placed over the threaded nipple 70, with the threaded nipple extending through the lower tab bore 28 and the lower tab 24 resting flat against the mounting surface 69. Next, the collar 68 is rethreaded onto the threaded nipple 70 and tightened thereupon.

Figure 4:
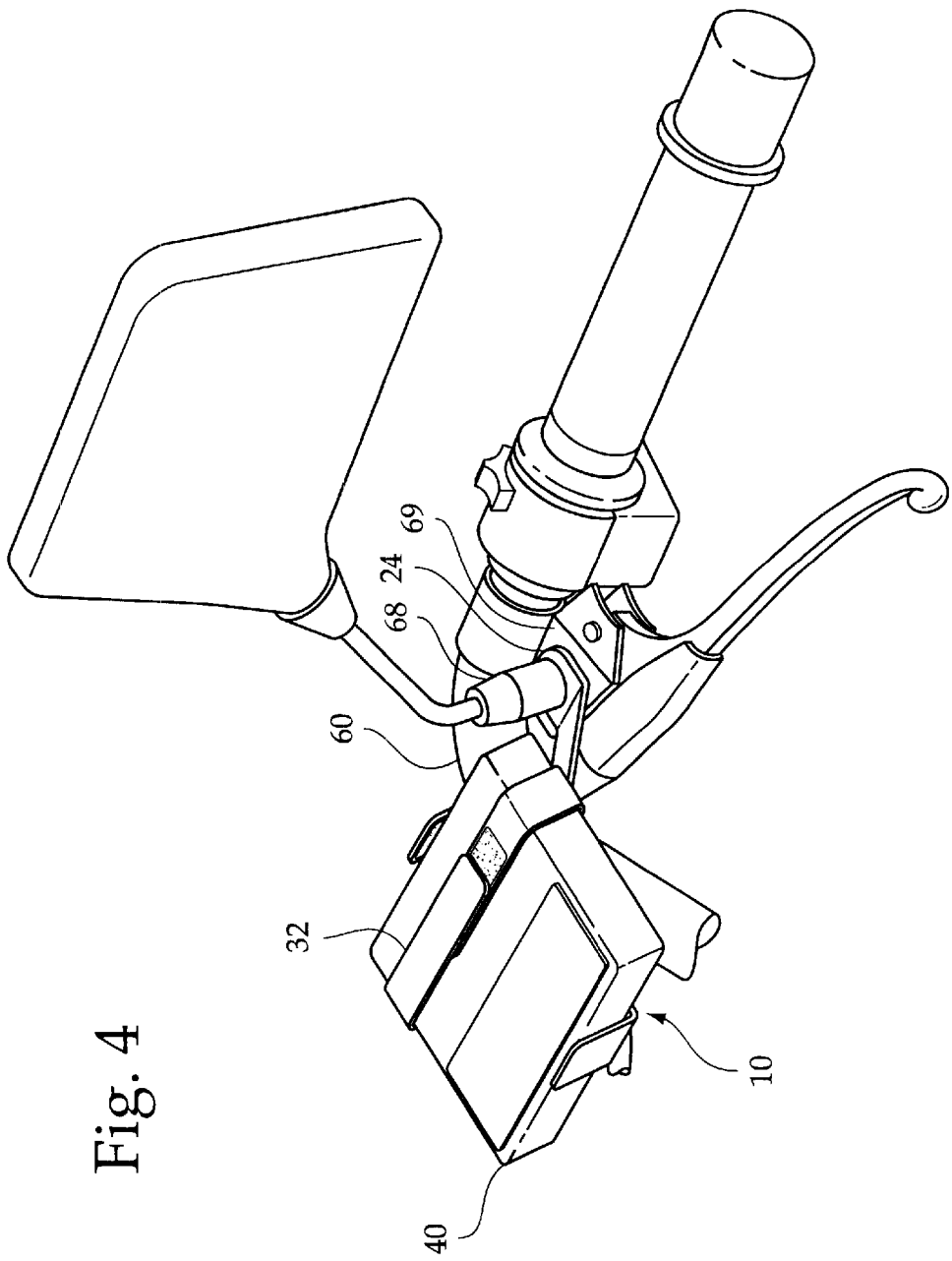
FIG. 4 is a diagrammatic perspective view, illustrating the display bracket mounted in place on the handle bar, wherein the transceiver is also held in place on the display bracket.

Referring to FIG. 4, the lower tab 24 is thereby held tightly onto the handle bar by virtue of being sandwiched between the collar 68 and mounting surface 69. Accordingly, the display bracket 10 is rigidly fastened to the handle bar 60. While the display bracket 10 remains rigidly attached to the handle bar, the transceiver 40 itself may be installed or removed from the holder 12 at will by simply undoing the securing strap 32.

In conclusion, herein is presented a device which allows an automatic toll-taking transceiver to be easily displayed upon a motorcycle, so that it can be detected and read at an automatic toll-taking facility, while providing convenience to the motorcyclist and maintaining safety therefor. The device includes a display bracket which may be easily mounted onto any motorcycle using the existing rearview mirror mounting assembly, and allows the transceiver to be easily and securely inserted in said bracket and easily removed therefrom as desired.

What is claimed is:

1. A display bracket for securing an automatic toll-taking transceiver onto a motorcycle having a handle bar having a mounting surface from which a threaded nipple extends, and a mirror mounting assembly including a collar which secures onto said threaded nipple, comprising:

a holder, including a main member having a pair of bends which create end walls which in turn create a u-shaped opening therebetween, the holder having a securing strap extending transverse to the main member, non-slip gripping material is located within the u-shaped opening, the securing strap having fastener material so that the strap can be formed into a closed loop and fastened upon itself, so that the transceiver can be held within the u-shaped opening and can be secured therein by wrapping the strap around the transceiver and fastening the strap upon itself; and an extension arm, comprising an upper tab, a lower tab, and a transition piece extending between the upper tab and lower tab, the upper tab rigidly attached to the main member of the holder, the lower tab having a lower tab bore extending therethrough, the lower tab bore for allowing the threaded nipple to extend therethrough so that the lower tab can be sandwiched between the mounting surface and collar for securing the display bracket onto the motorcycle handlebar, the upper tab and lower tab extend substantially parallel to each other, the transition piece forming equal obtuse angles with both the upper tab and lower tab, the extension arm adapted to be the sole connection between the holder and the motorcycle.

* * * * *